(12) United States Patent
Bullema et al.

(10) Patent No.: US 12,074,303 B2
(45) Date of Patent: Aug. 27, 2024

(54) ELECTRODE FOR USE IN A LAYERED DEVICE STRUCTURE, AS WELL AS A BATTERY DEVICE

(71) Applicant: Nederlandse Organisatie voor toegepast-natuurwetenschappelijk onderzoek TNO, 's-Gravenhage (NL)

(72) Inventors: Jan Eite Bullema, Helmond (NL); Cornelius Maria Rops, Waarle (NL); Maurice Pierre Marie Arthur Limpens, Elsloo (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 548 days.

(21) Appl. No.: 17/259,321

(22) PCT Filed: Jul. 12, 2019

(86) PCT No.: PCT/NL2019/050437
§ 371 (c)(1),
(2) Date: Jan. 11, 2021

(87) PCT Pub. No.: WO2020/013695
PCT Pub. Date: Jan. 16, 2020

(65) Prior Publication Data
US 2021/0159560 A1 May 27, 2021

(30) Foreign Application Priority Data
Jul. 12, 2018 (EP) .................................... 18183227

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/647* (2015.04);
(Continued)

(58) Field of Classification Search
CPC ............ H01M 10/613; H01M 10/654; H01M 10/655; H01M 10/6556; H01M 4/366
See application file for complete search history.

(56) References Cited

U.S. PATENT DOCUMENTS 7,433,794 B1   10/2008   Berdichevsky et al.
7,683,570 B2   3/2010   Krauer et al.
(Continued)

FOREIGN PATENT DOCUMENTS

CN   104577707 A   *   4/2015
CN   109037851 A   *   12/2018   .......... H01M 10/613
(Continued)

OTHER PUBLICATIONS

Machine translation of CN 109037851 (no date).*
(Continued)

*Primary Examiner* — Amanda C. Walke
(74) *Attorney, Agent, or Firm* — Leydig, Voit & Mayer, Ltd.

(57) ABSTRACT

The present document relates to an electrode for use in a layered device structure, the electrode comprising at least one layer of conductive material, wherein the electrode comprises at least one micro evaporator having an evaporator inlet for receiving a cooling fluid and an evaporator outlet for removing the cooling fluid after evaporation, wherein the micro evaporator includes a plurality of micro channels forming an evaporation volume, the micro channels being embedded in the layer of conductive material. The present document further relates to a battery design including such an electrode.

19 Claims, 4 Drawing Sheets

(51) Int. Cl.
*H01M 10/647* (2014.01)
*H01M 10/654* (2014.01)
*H01M 10/6569* (2014.01)
*H01M 4/02* (2006.01)
*H01M 50/103* (2021.01)
*H01M 50/107* (2021.01)

(52) U.S. Cl.
CPC ..... *H01M 10/654* (2015.04); *H01M 10/6569* (2015.04); *H01M 2004/021* (2013.01); *H01M 50/103* (2021.01); *H01M 50/107* (2021.01)

(56) References Cited

U.S. PATENT DOCUMENTS

| | | | |
|---|---|---|---|
| 7,683,575 | B2 | 3/2010 | Berdichevsky et al. |
| 7,741,816 | B2 | 6/2010 | Kelty et al. |
| 7,890,218 | B2 | 2/2011 | Adams et al. |
| 7,928,699 | B2 | 4/2011 | Kohn |
| 7,939,192 | B2 | 5/2011 | Hermann |
| 7,960,928 | B2 | 6/2011 | Tang |
| 8,004,243 | B2 | 8/2011 | Paryani et al. |
| 8,059,007 | B2 | 11/2011 | Hermann et al. |
| 8,088,511 | B2 | 1/2012 | Hermann et al. |
| 8,092,081 | B2 | 1/2012 | Hermann et al. |
| 8,154,256 | B2 | 4/2012 | Kreiner et al. |
| 8,361,649 | B2 | 1/2013 | Hermann et al. |
| 8,421,469 | B2 | 4/2013 | Hermann et al. |
| 8,441,826 | B2 | 5/2013 | Kroeze et al. |
| 8,450,966 | B2 | 5/2013 | Krauer et al. |
| 8,475,626 | B2 | 7/2013 | Rops et al. |
| 8,481,191 | B2 | 7/2013 | Hermann |
| 8,493,018 | B2 | 7/2013 | Kroeze et al. |
| 8,541,126 | B2 | 9/2013 | Hermann et al. |
| 8,552,693 | B2 | 10/2013 | Paryani |
| 8,618,775 | B2 | 12/2013 | Hermann et al. |
| 8,643,330 | B2 | 2/2014 | Nergaard et al. |
| 8,643,342 | B2 | 2/2014 | Mehta et al. |
| 8,647,763 | B2 | 2/2014 | Tennessen et al. |
| 8,760,898 | B2 | 6/2014 | Kroeze et al. |
| 8,773,058 | B2 | 7/2014 | Baglino et al. |
| 8,773,066 | B2 | 7/2014 | Kelty |
| 8,818,624 | B2 | 8/2014 | Small et al. |
| 8,862,414 | B2 | 10/2014 | LePort et al. |
| 8,899,492 | B2 | 12/2014 | Kelty et al. |
| 8,932,739 | B2 | 1/2015 | Hermann et al. |
| 8,963,494 | B2 | 2/2015 | Kishiyama et al. |
| 8,968,949 | B2 | 3/2015 | Hermann et al. |
| 8,970,147 | B2 | 3/2015 | Baglino et al. |
| 8,970,173 | B2 | 3/2015 | Kelty et al. |
| 9,045,030 | B2 | 6/2015 | Rawlinson et al. |
| 9,046,580 | B2 | 6/2015 | Hermann |
| 9,065,103 | B2 | 6/2015 | Straubel et al. |
| 9,083,064 | B2 | 7/2015 | LePort |
| 9,093,726 | B2 | 7/2015 | Prilutsky et al. |
| 9,343,911 | B2 | 5/2016 | LePort et al. |
| 9,419,450 | B2 | 8/2016 | Paryani et al. |
| 9,527,403 | B2 | 12/2016 | Mardall et al. |
| 9,527,406 | B2 | 12/2016 | Tang |
| 2009/0023056 | A1 | 1/2009 | Adams et al. |
| 2010/0151308 | A1 | 6/2010 | Hermann et al. |
| 2011/0000624 | A1 | 1/2011 | Rops et al. |
| 2011/0117403 | A1 | 5/2011 | Hermann et al. |
| 2011/0262783 | A1 | 10/2011 | Mehta |
| 2013/0015814 | A1 | 1/2013 | Kelty et al. |
| 2013/0071701 | A1 | 3/2013 | LePort et al. |
| 2014/0147731 | A1 | 5/2014 | Anastas et al. |
| 2014/0212708 | A1 | 7/2014 | Frey et al. |
| 2015/0165921 | A1 | 6/2015 | Paryani |
| 2016/0197501 | A1 | 7/2016 | LePort et al. |
| 2017/0074918 | A1 | 3/2017 | Stewart et al. |
| 2017/0087605 | A1 | 3/2017 | Melsert |
| 2017/0125760 | A1 | 5/2017 | Hermann |
| 2017/0294652 | A1 | 10/2017 | Arimoto et al. |
| 2017/0346134 | A1 | 11/2017 | Bandhauer |
| 2018/0183118 | A1* | 6/2018 | Harris ............... H01M 10/6551 |

FOREIGN PATENT DOCUMENTS

| | | | |
|---|---|---|---|
| DE | 102009004103 A1 | 7/2010 | |
| EP | 2072101 A1 | 6/2009 | |
| EP | 2180538 A1 | 4/2010 | |
| EP | 2266201 B1 | 10/2011 | |
| EP | 2587583 B1 | 6/2014 | |
| EP | 2533325 B1 | 1/2017 | |
| EP | 2234684 B1 | 3/2017 | |
| KR | 2017138202 A * | 12/2017 | ........ H01M 10/0413 |
| WO | WO 2017/96801 A1 | 11/2017 | |

OTHER PUBLICATIONS

Machine translation of KR 2017-138202 (no date).*
European Patent Office, International Search Report in corresponding International Application No. PCT/NL2019/050437, dated Sep. 9, 2019 (2 pages).
Dr. C.M. Rops et al., "Design and Development of an Ultra Compact Silicon Phase—Change Heat Exchanger," Proceedings of the $2^{nd}$ European Conference on Microfluids—Microfluids 2010—Toulhouse, pp. 1-9 (Dec. 8-10, 2010).
M. Mihailovic et al., "MEMS Silicon-Based Micro-Evaporator with Diamond-Shaped Fins," Elsevier, Procedia Engineering, No. 5, pp. 969-972 (2010).
Cornelius Maria Rops et al., Thesis on "Two-Phase Flow and Phase Change Heat Transfer in Small Structures," 151 pages (2009).

* cited by examiner

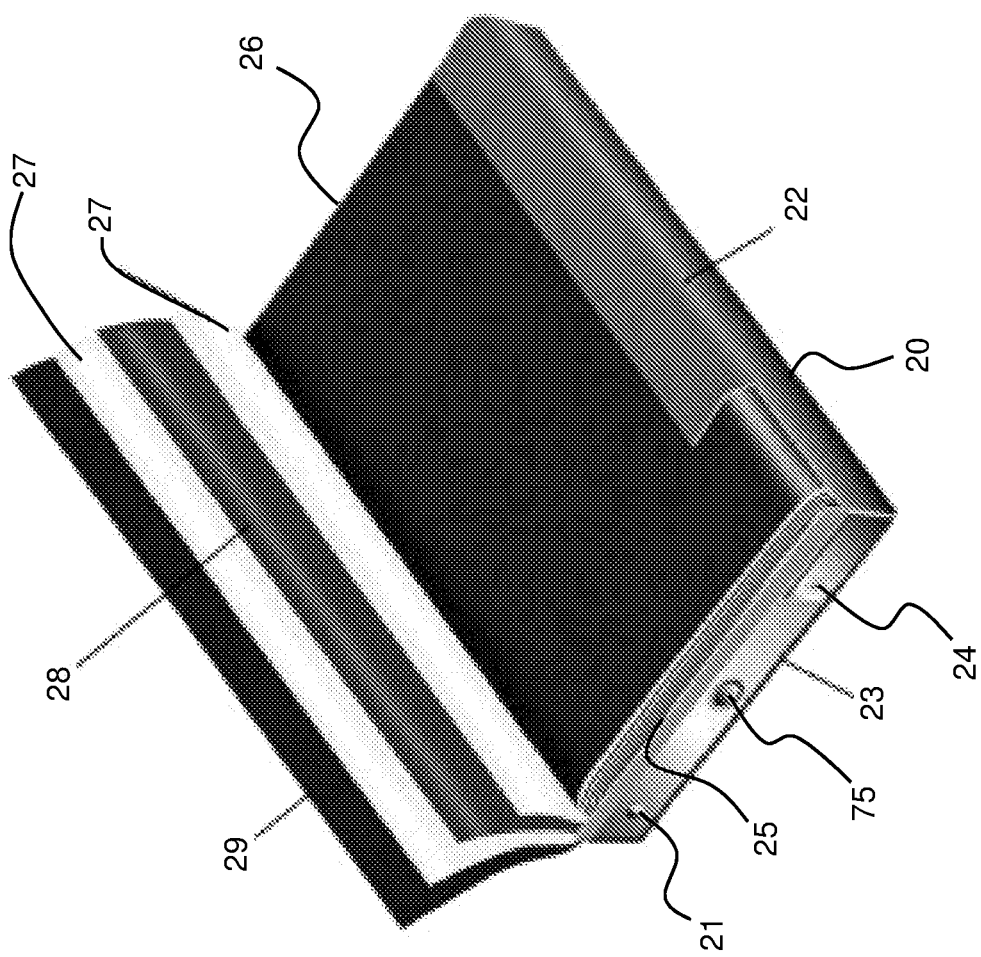

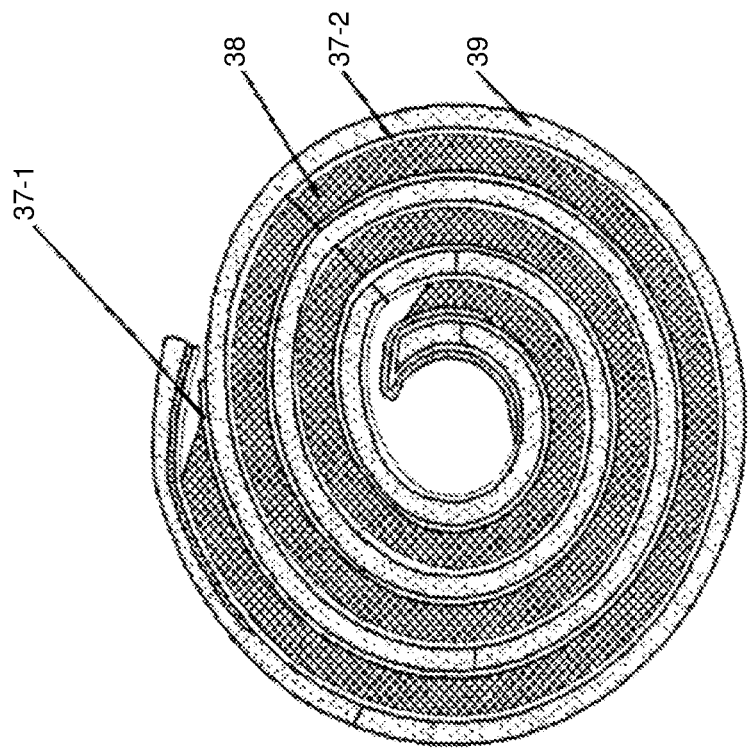
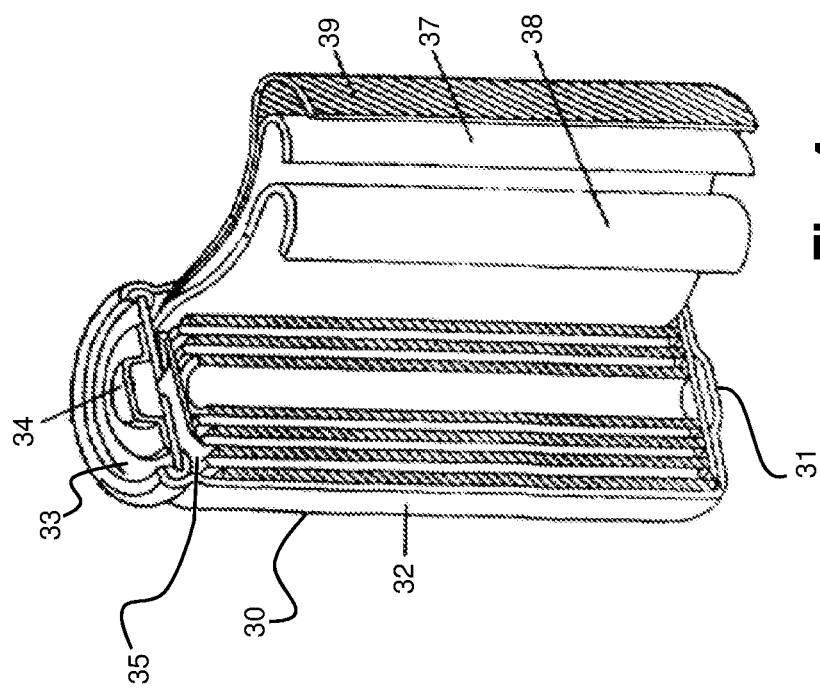

ELECTRODE FOR USE IN A LAYERED DEVICE STRUCTURE, AS WELL AS A BATTERY DEVICE

CROSS-REFERENCE TO RELATED APPLICATIONS

This patent application is a U.S. National Phase of PCT International Application No. PCT/NL2019/050437, filed Jul. 12, 2019, which claims priority to European Application No. 18183227.0, filed Jul. 12, 2018, which are both expressly incorporated by reference in their entireties, including any references contained therein.

BACKGROUND

New battery technology is difficult to develop because it is based on chemical reactions that are governed by the laws of thermodynamics. The major obstacle standing in the way of mass-market, plug-in, hybrid electric vehicles is the difficulty in making an affordable battery that can store enough energy to power a vehicle over long distances without overheating.

One promising type of battery is a lithium-ion battery, commonly used in laptop computers and cell phones. These batteries are light and can pack a lot of energy into a small space. But there are two problems with current lithium-ion batteries. First, they have an occasional tendency to overheat, release oxygen, and in rare cases burst into flames. Second, they cost twice as much as the nickel-metal hydride batteries currently used in hybrid cars.

Optimal thermal management requires high average heat transfer coefficient preferably over 5000 W/m$^2$K. Also the measure for thermal management should not lead to larger battery volumes. Various solutions for thermal management are available or are being tested, ranging from regular cooling structures such as fins to liquid cooling. For example, U.S. Pat. No. 8,647,763 teaches a battery coolant jacket that enables to hold a plurality of batteries within a liquid coolant circulation flow.

A disadvantage of most methods, including the above, is that they add on to the overall dimensions of the battery pack. Moreover, sufficient cooling requires an optimal exchange of heat between the battery and the cooling means. For the application described in U.S. Pat. No. 8,647,763, for example, the battery pack increases in size and also the heat exchange is dependent on the battery design.

SUMMARY OF THE INVENTION

It is an object of the present invention to provide a means for enabling optimal thermal management within batteries and other devices that are prone to damage and security risks due to overheating.

To this end, there is provided herewith an electrode for use in a layered device structure, the electrode comprising at least one layer of conductive material, wherein the electrode comprises at least one micro evaporator having an evaporator inlet for receiving a cooling fluid and an evaporator outlet for removing the cooling fluid after evaporation, wherein the micro evaporator includes a plurality of micro channels forming an evaporation volume, the micro channels being embedded in the layer of conductive material.

The electrode design in accordance with the present invention comprises an embedded cooling circuit. This allows to integrate internal cooling in a stacked arrangement of device layers that includes one or more electrode layers, which thereby achieves a highly efficient cooling of such devices. For example, in a battery, the embedded cooling circuit enables to regulate the temperature of the battery directly at the location inside the battery where heat is produced. Batteries provide a preferred application of the electrode of the present invention in view of the demand for efficient temperature control, e.g. to maintain a battery in preferred operational parameter ranges or to prevent damage or even fire due to overheating. However, other layered device structures that produce heat may likewise benefit from the use of the inventive electrodes. For example, various semiconductor devices such as light emitting diodes or transistors may likewise benefit from highly efficient heat sinking as provided using an electrode of the present invention within a layered device structure.

In accordance with the present invention the cooling circuit is provided by a micro evaporator. Heat sinking properties of the cooling circuit are very efficient during fluid phase changes such as melting or evaporation. Melting may not be very practical in a cooling circuit, as this requires an influx of solid material to enable melting thereof into a liquid. However, evaporation of a cooling fluid from a liquid state into a gas state certainly is practical and provides for optimal heat sinking from the device layers into the cooling circuit. In the present invention, an evaporator volume is formed by micro channels in the layer of conductive material, i.e. the micro channels may be created within the thickness of the layer of conductive material. Cooling fluid cannot leak from the micro channels into the surrounding material and device layers, because the micro channels are fully embedded in the layer of conductive material. The electrode includes an evaporator inlet and an evaporator outlet, and the micro channels forming the evaporator volume run from the inlet to the outlet underneath a part of the surface area of the electrode. The percentage of surface area underneath which the micro channels are running determines the heat sinking power of the cooling circuit of the invention. This percentage may be as large as possible to achieve a maximum cooling power for the electrode. As may be appreciated though, the electrode may also comprise more than one micro evaporator, each with a respective evaporator inlet and evaporator outlet, to cover larger areas of the electrode.

In accordance with embodiments of the invention, the at least one layer of conductive material of the electrode comprises at least a first and a second layer, wherein the micro channels are embedded in at least one of the first or the second layer, and wherein the first and the second layer are attached to each other such as to cover the micro channels between the first and the second layer. In this embodiment, the micro channels may be created in the first layer, for example by means of imprinting, etching, melting, milling, drilling, or cutting such as laser induced cutting. The channels may be slightly more shallow than the thickness of the first layer. Thereafter the second layer is attached such as to sandwich the micro channels between the first and second layer. The second layer may be attached e.g. by welding, gluing or another suitable method that enables to attach the second layer such that it is free of leaks.

In accordance with some embodiments, the micro channels having depth in the direction of thickness of the at least one layer of conductive material, the depth being smaller than 5 millimeter, preferably smaller than 2 millimeter, more preferably smaller than 1 millimeter, and even more preferably between 50 micrometer and 200 micrometer.

In some preferred embodiments of the invention, the evaporation volume comprises a plurality of micro channels in a crossing arrangement such as to provide a fin like repetitive structure including a plurality of fins. A major advantage of these embodiment is that the fins strongly increase the heat exchange between the micro channels and the walls and surrounding material. At the same time, though, these fins also break-up bubbles that are formed in the evaporator due to evaporation. The breaking-up of bubbles prevents the flow from entering the slug-flow state of a multiphase flow. Any vapor slugs that tend to form during evaporation are broken up by the fins. This results in the multiphase flow to enter the annular flow stage early. In an annular flow, a vapor or gas fraction is conveyed through the center of a channel and a liquid fraction is conveyed through a film at the walls of the channel (i.e. forming an annulus). Annular flows are known to exhibit very efficient heat transfer between the vapor/gas fraction and the liquid fraction due to entrainment and remixing on the interface between liquid and gas/vapor. Heat exchange between the liquid and the wall is also optimal under these conditions. On the other hand, slug formation is to be prevented as much as possible due to the resulting pressure fluctuations and blockage of the channels.

In certain of the above preferred embodiments, one or more or all of the fins, in the flow direction, have a cross sectional shape selected from a group comprising: diamond, rectangle, elliptic, aerofoil shaped, double wedged aerofoil shaped or double arc aerofoil shaped. Any of these shapes provide for sufficiently good properties in terms of droplet break-up and the preventing of pressure fluctuations. Some of these, such as the regular pattern of diamonds forming the fins, may be created more easily than the more complex shapes (such as aerofoil shapes).

In accordance with some embodiments, the at least one layer of conductive material includes a conductive sheet of material configured for being included in a layer arrangement for forming a battery, wherein the conductive sheet includes a plurality of micro evaporators extending between their respective evaporator inlets and evaporator outlets. In some of these embodiments, the conductive sheet is configured to be stacked in a flat layered arrangement for use in a prismatic type battery. In other of these embodiments, the conductive sheet is configured to be rolled in a cylindrical arrangement for use in a cylindrical type battery. Optionally for such embodiments, the evaporator inlets and evaporator outlets are located on the conductive sheet such as to be on opposite sides of the cylindrical arrangement. The latter allows to roll-up the conductive sheet with other layers, such as to yield evaporator inlet connections and evaporator outlet connections on opposite sides of the cylinder, geometrically isolated from each other in the design.

In accordance with some embodiments, there is provided a layered device structure, such as a semiconductor device structure or a battery device structure, the layered device structure comprising an electrode in accordance with any of the embodiments described above.

In accordance with a second aspect of the invention, there is provided a battery device comprising a layered structure accommodated within a housing, the battery device including an electrolyte, and at least a first electrode layer and a second electrode layer, wherein the first and the second electrode layer are separated by at least one separator layer, wherein at least one of the first or second electrode layer comprises an electrode according to any one or more of the preceding claims, the at least one electrode comprising at least one layer of conductive material, wherein the electrode comprises a micro evaporator having an inlet for receiving a cooling fluid and an outlet for removing the cooling fluid after evaporation, wherein the micro evaporator includes a plurality of micro channels forming an evaporation volume, the micro channels being embedded in the layer of conductive material; the battery further including a flow transport structure for providing the cooling fluid to the inlet of the micro evaporator and for removing the cooling fluid from the outlet after evaporation.

The battery, in accordance with this second aspect, forms a preferred application of the electrode in accordance with the first aspect, as is explained earlier above. The flow transport structure may be part of an internal temperature regulation structure of the battery device. This may be beneficial in larger battery devices that are suitable for use in large applications such as electrical vehicles. The flow regulation structure may be designed to operate automatically or semi-automatically upon connection or operation of the battery (i.e. when it delivers power to the vehicle, or in case the battery heats up too much). The flow transport structure may also be connected to an exterior temperature regulation structure.

For example, in another embodiment of the second aspect, the housing of the battery further includes a battery cooling inlet and a battery cooling outlet for receiving the cooling fluid from a cooling fluid supply. The cooling inlet may be connected to a cooling fluid supply, and the cooling outlet to a heat exchanger or heat cycle and thereafter to the supply. The heat exchanger may be used to win back heat such as to improve the overall efficiency of the apparatus wherein the battery is used. Alternatively or additionally, the heat exchanger may be applied to pre-heat cooling fluid prior to it entering the micro evaporator. In this case, regulation of the heat exchange capabilities of the heat exchanger allow to regulate the thermal operation properties of the cooling circuits in the batteries, e.g. such as to adapt it to an optimal battery temperature or so.

According to an embodiment, the transport structure further comprises at least one of: an inlet manifold for receiving an ingress cooling fluid and dividing the cooling fluid amongst the or each evaporator inlet of the at least one electrode; and an outlet manifold for receiving the egress cooling fluid from the or each evaporator outlet of the at least one electrode. These elements may respectively located on opposite sides of the layered structure of the battery.

In certain embodiments, the at least one layer of conductive material includes a conductive sheet which is rolled in a cylindrical arrangement with additional battery layers for forming a cylindrical type battery, wherein the conductive sheet includes a plurality of micro evaporators each extending in a longitudinal direction of the battery between their respective evaporator inlets and evaporator outlets which are located on opposite sides of the battery. These embodiments provide for a cylindrical type battery with internal cooling.

Yet in other embodiments, the at least one layer of conductive material includes a conductive sheet which is stacked in the layered structure of the battery to thereby form a prismatic type battery, wherein the conductive sheet includes a plurality of micro evaporators extending between their respective evaporator inlets and evaporator outlets.

In some embodiments of the battery, one or more side faces of the layered structure include a sealing material for preventing fluid, such as cooling fluid, from penetrating at least one of the layers from a group comprising: the or each separator layer, the or each first electrode layer, the or each second electrode layer, the electrolyte or a layer containing the electrolyte. For example, in a cylindrical cell, the sealing material may be a polymer or resin that closes the separator, electrolyte and other battery layers that need to be protected from the cooling fluid. This material may be located on the top and bottom end side of the cylinder.

In accordance with some embodiments, the housing inlet and housing outlet are further connectable to a flow regulation system, the flow regulation system including a controller for controlling a pressure in the or each micro evaporator. The conditions under which evaporation occurs may also be regulated by regulating the pressure, e.g. by means of a flow regulation system as in these embodiments. Furthermore, in other embodiments, the battery device itself includes an internal flow regulation system, the flow regulation system including a controller for controlling a pressure in the or each micro evaporator.

The invention further relates to a use of an electrode according to the first aspect, for the manufacturing of a device comprising a layered device structure, such as a semiconductor device or a battery device.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 3 provides a cut-away illustration of a prismatic cell type battery wherein an embodiment of the invention may be applied;

FIGS. 4a and 4b show an exemplary design of a cylindrical type cell;

DETAILED DESCRIPTION

In this description the same or corresponding parts will have identical or similar reference signs. The embodiments shown should not be understood as limiting the invention in any way or form.

Figure 1:
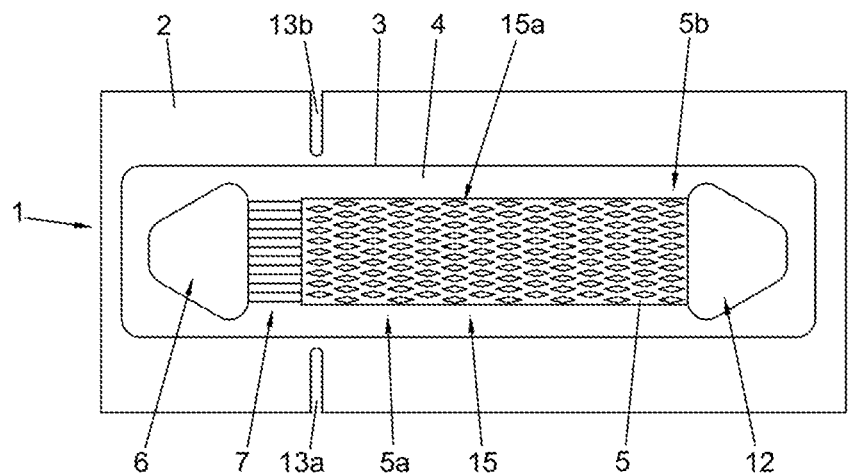
FIG. 1 illustrates an embodiment of an electrode layer having an embedded cooling system integrated therein.
Figure 2:
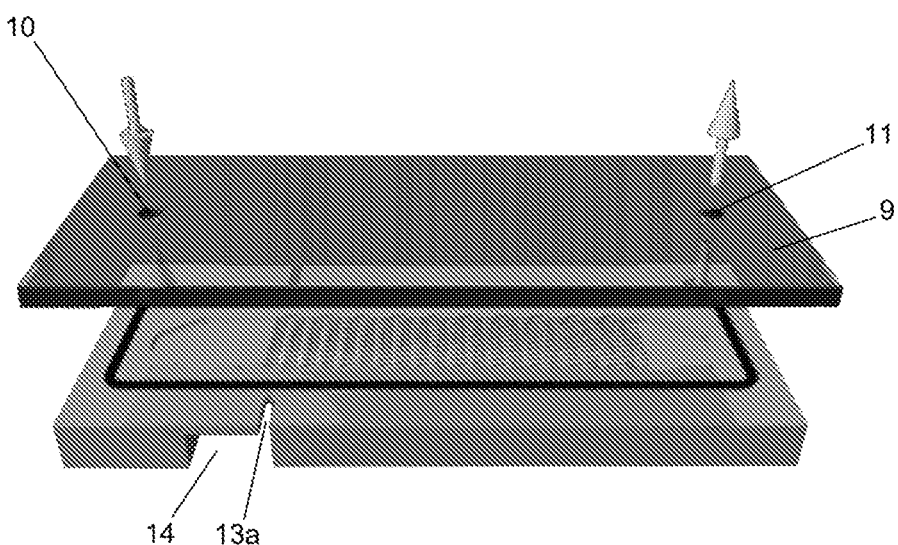
FIG. 2 illustrates an embodiment of an electrode including the electrode layer of FIG. 1.

FIGS. 1 and 2 illustrate an embodiment of an electrode having an embedded cooling system integrated therein. In the figures, the cooling system includes an evaporator wherein an ingress cooling fluid changes state (e.g. by evaporation from liquid to gas) and thereby draws heat from it's surroundings. As may be appreciated, although the present embodiment applies an evaporation process to perform cooling, the cooling system may alternatively function without evaporation by letting a cooling fluid flow through the electrode in absence of a state change (e.g. by using a cooling gas or cooling liquid that does not change state). This may be implemented in a similar manner, but optionally some alterations to the design may be made in view of performance thereof. The advantage of applying evaporation (or an alternative state change) is that this process requires more heat from it's surroundings to be performed. As a result, the integrated cooling system will provide more cooling power to effectively cool processes that produce a lot of heat. Batteries are just one application thereof, but alternatively other layered device structures that produce heat may benefit from an electrode with integrated—embedded—cooling system.

FIG. 1 depicts an evaporator 1 embedded in a first electrode layer 2. A groove 3 is machined in the first electrode layer 2 wherein a seal 4 may be placed. The groove 3 and seal 4 are optional, as may be understood, since sealing of the evaporator 1 between a first electrode layer 2 and a second electrode layer 9 (see FIG. 2) may be achieved in alternative manners. For example, the two layers 2 and 9 may be attached or adhered to each other by means of welding, or by using an electrically conductive paste or resin. The first electrode layer 2 and second electrode layer 9 may be fabricated from a conductive material, for instance a metal such as copper, aluminum or gold, or an intrinsically conductive polymer (ICP), or a different conductive material, e.g. carbon or a carbon containing composition. Other suitable metals and/or metal compositions can be applied as well. Occasionally, e.g. when used in combination with potentially corrosive cooling fluids, the conductive material—within the evaporator 1—may be provided with a coating of a less reactive material in order to prevent corrosion or other unfavorable reactions.

Within the first electrode layer 2, the evaporating chamber 5 is positioned. The evaporator chamber is at its inlet side 5a connected to a set of supply channels 7, which are connected to an inlet manifold 6. The supply channels create a pressure drop preventing vapor bubbles in the heat transfer area from travelling upstream into the inlet manifold 6. As these channels pose the strongest restriction to flow of the whole system, it is expected that the pressure drop over the system is mainly determined by the flow through these channels.

The cross section of the evaporation chamber 5 is substantially constant along the flow path of the chamber 5. The inlet manifold or inlet manifold 6 should be designed such that no vapor is retained therein. If vapor is retained in the inlet manifold, some of the supply channels 7a of the supply structure 7 can block, which can lead to mal-distribution of the fluid and/or the occurrence of dead zones within the evaporation chamber 5. The inlet manifold can additionally be provided with guidance fills or other guidance structures to enhance a well distributed flow.

Liquid cooling fluid enters the inlet manifold 6 via a port or inlet 10 in the second electrode layer 9. The inlet 10 and outlet 11 may be located elsewhere, for example in the first electrode layer 2, or on the longitudinal end sides or either one or both of the first and second electrode layers 2 and 9. This is a matter of design, dependent on the application. For example, in the embodiment of FIG. 5, it may be advantageous to locate the inlet 10 and outlet 11 on the end parts in longitudinal direction of the battery.

The liquid cooling fluid is spread across the manifold 6, mostly without encapsulating air, and it will flow into the heat transfer area of the evaporator chamber 5 via narrow supply channels 7a. These channels 7a prevent backflow of vapor into the inlet manifold 6. The heat transfer area of the evaporation chamber 5 is equipped with fins 15a formed by diamond pillars that serve four purposes:
1. Expanding the surface area available for heat transfer. As a result, high mass flow rates can be achieved.
2. Creating small channels in which surface tension forces are significant compared to inertia forces of the flow and forces resulting from explosive vapor bubble expansion. Surface tension enhances the distribution over the channels between the diamond structures.
3. Creating a pressure drop by obstructing the flow. The result of this is that the phase transition area (PTA)— the zone in which nucleate boiling is taking place—is reduced in length. Additionally, the surface tension in the small channels tends to stabilize the phase boundary.

4. Vapor bubbles and liquid slugs will break up on the (sharp) edges of the diamond structures, increasing the surface area of the phase boundary. The annular flow type breaks down large scale oscillations.

In embodiments that do not apply evaporation, the fins 15a may be absent in absence of bubble formation. However, as the fins 15a also serve the purpose of improving heat transfer by maximizing the contact surface with the flow, the fins 15a may also be present in embodiments without evaporation or a similar state change. The fins 15a, which are here formed by diamond pillars, may be differently designed. For example, instead of diamond shaped pillars, pillars may be shaped as rectangles or ellipses, or may be aerofoil shaped, double wedged aerofoil shaped or double arc aerofoil shaped. Other shapes may likewise be applied, and the invention is not limited to a particular cross-sectional shape of the pillars or structures forming the fins 15a.

The outlet manifold 12 can act as a phase separation area. If the out flowing medium contains both liquid and vapor phases, these phases will be separated in the outlet manifold 12. The vapor will leave the manifold 12 via the outlet port 11 and the liquid will stay in the outlet manifold 12 or flow back into the heat transfer area 5. In both cases it will eventually evaporate and leave the manifold 12 as vapor.

The electrode structure obtained may effectively be applied in a device generating heat, e.g. a layered device such as a battery or an integrated circuit requiring cooling for reliable operation, wherein it may be very effective in heat reduction from the inside of the device. The heat is produced directly contiguous to the electrode layers, and the evaporator inside the electrodes enable to very effectively cool down the device.

In FIG. 2, the cover part 9 is provided with an inlet 10 and an outlet 11. When the cover part 9 is placed on the first electrode layer 2, the inlet 10 coincides with the inlet manifold 6 and is in fluid connection therewith. Similarly the outlet 11 coincides with the outlet manifold 12 and is in fluid connection therewith. The first electrode layer 2 is provided with slots 13a and 13b and with opening 14 cut away from the housing in order to increase the temperature jump between the section of the first electrode layer 2 wherein the evaporation chamber 5 is provided and the section of the first electrode layer 2 with the supply structure 7. This prevents any liquid from prematurely evaporating within the channels of the supply structure 7.

The evaporation chamber 5 is equipped with a regular argyle structure 15 of fins 15a, here formed by diamond shaped pillars. The argyle structure 15 has an orientation such that the fluid experiences in its main flow direction the fins 15a in a staggered way. Thus any vapor enclosures (bubbles, slugs) break up rapidly and efficiently by colliding with a diamond pillar positioned in a staggered manner downstream the flow path of two upstream pillars where the fluid is originating from. The sharp edges of the diamond shaped pillars 15a will provide an efficient break up of any slug or bubble.

Furthermore the argyle structure 15 provides a surprisingly good distribution and redistribution of fluid flow with the evaporation chamber 5. In one experiment some of the supply channels were blocked. This lead to an initially uneven distribution of fluid flow, however the argyle structure 15 of arranged diamond pillar fins 15a could redistribute the fluid efficiently within the evaporator chamber 5.

The second electrode layer 9 and the first electrode layer 2 can be tightly closed off by the seal 4. Thereto the seal 4 is captured by groove 3 and is slightly offset with respect to the upper surface of the first electrode layer 2. The first electrode layer 2 and the second electrode layers 9 are preferably made of a same conducting material, e.g. a conducting metal such as copper, aluminum, gold or the like. This, however is not essential, and in certain embodiments the first and second electrode layers 2 and 9 may be of different materials. Also, where desired, where the electrode to be formed only requires an electrically conductive connection on one side thereof, one of the electrode layers (e.g. the second electrode layer 9) may be made of a different material (e.g. an insulating material). Alternatively, the first or second electrode layer 2 or 9, in embodiments where a conductive material is desired, may also be fabricated from a transparent conductive polymer material to reveal the cooling system to the exterior of the device. For example, the second electrode layer 9 and/or the first electrode layer 2 may be made of e.g. poly(3,4-ethylenedioxythiophene) or PEDOT:PSS, or polyaniline:polystyrene sulfonate (polyaniline:PSS). This may provide a desired aesthetic effect.

FIG. 3 provides a cut-away illustration of a prismatic cell type battery 20. The battery 20 comprises a layered structure of consecutive functional layers 27, 28 and 29. These layers include cathode layers 28 and anode layers 29, separated by separator layers 27 in a manner well known to the person skilled in the art. The layers may be stacked, or alternatively a flattened roll of consecutive layers (much like in a cylindrical cell, but flattened instead) may be provided inside the cell 20. These layers 27, 28 and 29 are encased in a housing 22. FIG. 3 shows an end part 23 of the housing 22 which provides room for placement of terminals, such as negative terminal 21 and positive terminal 24. Dependent on the design of the cell 20, these terminals 21 and 24 may be located at anywhere on the housing.

The prismatic cell 20, in accordance with the present invention, may also include an inlet 75 located on the end part 23 of the housing 22. The inlet 75 connects to a manifold located within the housing 22 in the compartment 25 underneath the end part 23 of the housing 22. Dependent on the battery design, such an inlet and manifold may be located elsewhere on and in the battery. In accordance with some embodiments, in particular in large cell designs that may be used for industrial applications or in electric vehicles, a cooling system may even be integrated completely within the battery design, without requiring an external feed of cooling fluid (or optionally including a (refillable) cooling fluid reservoir). In the embodiment of FIG. 3, an outlet for removing the cooling fluid after flowing through the electrodes (e.g. cathode 28) may be located at end part 26.

Figure 5:
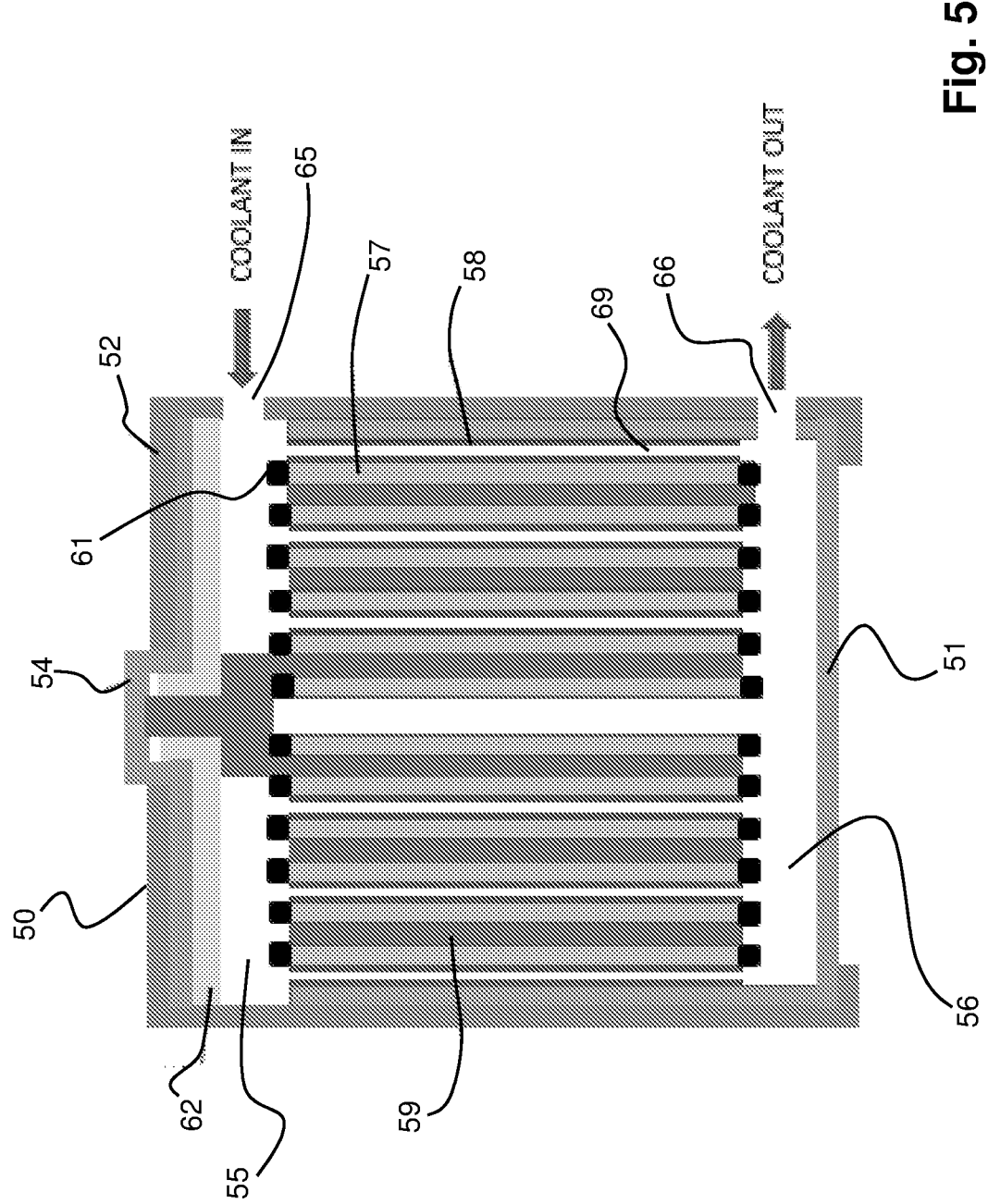
FIG. 5 illustrates a cross-section of a cylindrical cell in accordance with an embodiment of the invention.

FIGS. 4a and 4b show an exemplary design of a conventional cylindrical type cell 30. An embodiment of a cylindrical type cell in accordance with the invention is illustrated in FIG. 5. However, FIGS. 4a and 4b will first be discussed for explanatory purposes.

In FIGS. 4a and 4b, a cylindrical cell 30 includes a plurality of device layers 37, 38 and 39 in a rolled configuration. FIG. 4a provides a cut-away illustration, whereas FIG. 4b provides a cross-section of such a layered structure. The housing 32 of cell 30 includes end parts 33 that provide room for the positive terminal 34 and the negative terminal 31. The internal space 35 provides room for connections, sealing layers and further functional elements. In FIG. 4b, the cross-section of the device layers (transverse to the longitudinal direction of the battery 30) reveals the rolled-up configuration. Cathode layer 38 and anode layer 39 are separated from each other by separator layers 37-1 and 37-2.

FIG. 5 illustrates a cross-section of a cylindrical cell 50 in accordance with an embodiment of the invention, parallel to the longitudinal direction of the cell. The cell includes a housing 52, with a positive terminal 54 and a negative terminal 51 at the opposite longitudinal end parts of the housing 52, similar to the cell 30 in FIGS. 4a and 4b. The housing 52 further includes an inlet 65 and outlet 66. The inlet 65 allows to supply cooling fluid to the battery 50, and the outlet 66 enables removal of the cooling fluid after it has left the cooling system integrated in the electrodes. Thereby, a manifold 55 is formed at a first internal longitudinal end, and at the opposite end of the battery, cooling fluid is collected in space 56 before removal through the outlet 66. The manifold 55 is closed by a pressure plate 62. Moreover, the separators 57 include sealing layers 61 at the end parts to prevent the cooling fluid from contacting the separator material.

The electrode structure is similar to the structure of cell 30, consisting of a rolled configuration of electrodes. These include anodes 59 and cathodes 58, wherein the cathodes 58 include the electrode design of the present invention, including an embedded cooling system. The cooling systems, which may be similar to the evaporator system illustrated in FIG. 1, is schematically indicated by a channel 69. A plurality of evaporators may be distributed across the full surface area of the electrodes 28.

The cooling fluid, external to the battery, is collected by a flow regulation system (not shown). This flow regulation system may include a controller for controlling a pressure in the micro evaporators. Moreover, heat exchangers included in the flow regulation system may cool down the cooling fluid such that it condenses again. Thereafter it may be supplied to the battery 50 again to perform cooling.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. An electrode for use in a layered device structure, the electrode comprising:
   at least one layer of conductive material; and
   at least one micro evaporator having an evaporator inlet for receiving a cooling fluid and an evaporator outlet for removing the cooling fluid after evaporation,
   wherein each one of the at least one micro evaporator includes a plurality of micro channels forming an evaporation volume, and
   wherein each of the plurality of micro channels is embedded in the at least one layer of conductive material.

2. The electrode according to claim 1, wherein the at least one layer of conductive material comprises at least a first layer and a second layer,
   wherein the micro channels are embedded in at least one of the first layer or the second layer, and
   wherein the first layer and the second layer are attached to each other such as to cover the micro channels between the first and the second layer.

3. The electrode according to claim 1, wherein the micro channels have a depth in a direction of thickness of the at least one layer of conductive material smaller than 5 millimeter.

4. The electrode according to claim 1, wherein the evaporation volume comprises a plurality of micro channels in a crossing arrangement so as to provide a fin-like repetitive structure including a plurality of fins.

5. The electrode according to claim 4, wherein one or more of the fins, in a direction of flow, have a cross sectional shape selected from a group consisting of: diamond, rectangle, elliptic, aerofoil shaped, double wedged aerofoil shaped, and double arc aerofoil shaped.

6. The electrode according to claim 1, wherein the at least one layer of conductive material includes a conductive sheet of material configured for being included in a layer arrangement for forming a battery, wherein the conductive sheet of material includes a plurality of micro evaporators extending between respective evaporator inlets and evaporator outlets; and wherein the conductive sheet is configure to be at least one of the group consisting of:
   stacked in a flat layered arrangement for use in a prismatic type battery; and
   rolled in a cylindrical arrangement for use in a cylindrical type battery, wherein the evaporator inlets and evaporator outlets are located on the conductive sheet so as to be on opposite sides of the cylindrical arrangement.

7. The electrode according to claim 1, wherein the micro channels have a depth in a direction of thickness of the at least one layer of conductive material smaller than 2 millimeter.

8. The electrode according to claim 1, wherein the micro channels have a depth in a direction of thickness of the at least one layer of conductive material smaller than 1 millimeter.

9. The electrode according to claim 1, wherein the micro channels have a depth in a direction of thickness of the at least one layer of conductive material smaller than 200 micrometer.

10. The electrode according to claim 9, wherein the micro channels have a depth in a direction of thickness of the at least one layer of conductive material greater than 50 micrometer.

11. A layered device structure comprising the electrode in accordance with claim 1.

12. A battery device comprising a layered structure accommodated within a housing, the battery device including:
an electrolyte;
at least a first electrode layer; and
a second electrode layer,
wherein the first electrode layer and the second electrode layer are separated by at least one separator layer,
wherein at least one of the first electrode layer or second electrode layer comprises an electrode comprising:
at least one layer of conductive material; and
a micro evaporator having an inlet for receiving a cooling fluid and an outlet for removing the cooling fluid after evaporation,
wherein the micro evaporator includes a plurality of micro channels forming an evaporation volume, the micro channels being embedded in the at least one layer of conductive material;
wherein the battery further includes a flow transport structure for providing the cooling fluid to the inlet of the micro evaporator and for removing the cooling fluid from the outlet after evaporation.

13. The battery device according to claim 12, wherein the housing further includes a battery cooling inlet and a battery cooling outlet for receiving the cooling fluid from a cooling fluid supply.

14. The battery device according to claim 13, wherein the at least one layer of conductive material includes a conductive sheet that is rolled in a cylindrical arrangement with additional battery layers for forming a cylindrical type battery, wherein the conductive sheet includes a plurality of micro evaporators, wherein each of the micro evaporators extends in a longitudinal direction of the battery between respective evaporator inlets and evaporator outlets that are located on opposite sides of the battery.

15. The battery device according to claim 13, wherein the at least one layer of conductive material includes a conductive sheet that is stacked in the layered structure of the battery to form a prismatic type battery, wherein the conductive sheet includes a plurality of micro evaporators extending between respective evaporator inlets and evaporator outlets.

16. The battery device according to claim 13, wherein the housing inlet and housing outlet are further connectable to a flow regulation system including a controller for controlling a pressure in the or each micro evaporator.

17. The battery device according to claim 12, wherein the flow transport structure further comprises at least one of the group consisting of:
an inlet manifold for receiving an ingress cooling fluid and dividing the cooling fluid amongst each evaporator inlet of the at least one electrode; and
an outlet manifold for receiving the egress cooling fluid from each evaporator outlet of the at least one electrode.

18. The battery device according to claim 12, wherein one or more side faces of the layered structure include a sealing material for preventing fluid from penetrating at least one of the layers from a group comprising: each separator layer, each first electrode layer, each second electrode layer, the electrolyte, and a layer containing the electrolyte.

19. The battery device according to claim 12, wherein the battery device further includes an internal flow regulation system including a controller for controlling a pressure in each micro evaporator.

* * * * *

UNITED STATES PATENT AND TRADEMARK OFFICE
CERTIFICATE OF CORRECTION

PATENT NO. : 12,074,303 B2  
APPLICATION NO. : 17/259321  
DATED : August 27, 2024  
INVENTOR(S) : Jan Eite Bullema et al.

Page 1 of 1

It is certified that error appears in the above-identified patent and that said Letters Patent is hereby corrected as shown below:

On the Title Page

Item (72) for Inventor Cornelius Maria ROPS city of residence should read -- Waalre --.

Signed and Sealed this  
Twenty-fourth Day of June, 2025

Coke Morgan Stewart  
*Acting Director of the United States Patent and Trademark Office*